United States Patent
Baltar

(10) Patent No.: US 6,358,553 B1
(45) Date of Patent: Mar. 19, 2002

(54) SALAD DRESSING EMULSION

(76) Inventor: Julio Baltar, 4421 Pembroke Dr., Concord, CA (US) 94521

( * ) Notice: Subject to any disclaimer, the term of this patent is extended or adjusted under 35 U.S.C. 154(b) by 0 days.

(21) Appl. No.: 09/427,339

(22) Filed: Oct. 26, 1999

(51) Int. Cl.[7] ................................................. A23D 7/02
(52) U.S. Cl. ........................ 426/602; 426/582; 426/613
(58) Field of Search ................................ 426/602, 573, 426/613, 582

(56) References Cited

U.S. PATENT DOCUMENTS

| | | | | |
|---|---|---|---|---|
| 2,185,465 A | * | 1/1940 | Ingraham | 426/602 |
| 3,067,038 A | * | 12/1962 | O'Connell | 426/602 |
| 3,093,486 A | * | 6/1963 | Krett | 426/602 |
| 3,108,879 A | * | 10/1963 | Heinemann | 426/602 |
| 3,889,005 A | * | 6/1975 | Brammer | 426/602 |
| 3,917,859 A | * | 11/1975 | Terada | 426/602 |
| 4,107,335 A | * | 8/1978 | Glickstein | 426/601 |
| 4,129,663 A | | 12/1978 | Jamison et al. | |
| 4,248,897 A | * | 2/1981 | Christensen | 426/36 |
| 4,299,856 A | | 11/1981 | Zirbel | |
| 4,304,795 A | * | 12/1981 | Takada | 426/602 |
| 4,701,338 A | * | 10/1987 | Del Vento | 426/602 |
| 5,654,029 A | | 8/1997 | Heeringa et al. | |
| 5,817,363 A | * | 10/1998 | Bakker | 426/602 |
| 5,922,391 A | * | 7/1999 | Trueck | 426/605 |
| 6,090,432 A | * | 7/2000 | McKeown | 426/601 |

OTHER PUBLICATIONS

Rombauer. 1997. Joy of Cooking. A Plume Book. Penguin Group. New York. pp. 360–361.*
Lowe 1937 Experimental Cookery John Wiley & Sons London pp. 266–269, 273, 286.*
Kamman 1997 The New Making of a Cook William Morrow & Company, Inc. pp. 72–75 New York.*
Montagne 1961 Larousse Gastronomique Crown Publishers, Inc, New York pp. 233–234, 336.*

* cited by examiner

Primary Examiner—Carolyn Paden
(74) Attorney, Agent, or Firm—Theodore J. Bielen, Jr.

(57) ABSTRACT

A salad dressing emulsion of high stability utilizing a continuous oil phase and a dispersed acidic aqueous phase. A sufficient mount of divided solid curd is suspended in the emulsion to maintain the dispersion of the acidic aqueous phases for a relatively long period of time.

2 Claims, 1 Drawing Sheet

SALAD DRESSING EMULSION

BACKGROUND OF THE INVENTION

The present invention relates to a novel salad dressing emulsion of high stability and having a long shelf life.

Salad dressings composed of the basic oil and vinegar ingredients have been formed with many additional ingredients for the purpose of increasing stability, shelf life, and the like. Unfortunately, many dressings of this type use preservatives and heating or cooling steps in the preparation. Unfortunately, these additional components and the process of heating or cooling change the flavor or taste of the finished salad dressing.

For example, U.S. Pat. No. 4,299,856 shows a method for preparing an edible suspension product in which a buffering agent is used to elevate its pH. Heating steps are also applied with the addition of solid material to prevent coagulation.

U.S. Pat. No. 5,654,029 shows a salad dressing of a vinaigrette type. Stability is attained in such salad dressing by adding additional solid fat to the continuous oil phase, preferably hardened grapeseed oil.

U.S. Pat. No. 4,129,663 shows a pourable salad dressing composition containing Xanthin gum and pectin as stabilizers.

U.S. Pat. No. 4,701,338 teaches a multi-step process for making an oil and vinegar salad dressing in which oil and vinegar are mixed with spices and herbs, as well as a preservative. The mixture is also heated and cooled prior to storage.

A salad dressing emulsion having an unusual stability and an acceptable shelf life without the use of heating or cooling steps and without the addition of preservatives would be a notable advance in the food preparation industry.

BRIEF SUMMARY OF THE INVENTION

In accordance with the present invention a novel and useful salad dressing emulsion is herein provided.

The emulsion of the present invention utilizes a continuous oil phase and a dispersed acidic aqueous phase. For example the continuous oil phase may include olive oil, sunflower oil, or other oils commonly used with salad dressings. The dispersed acidic aqueous phase may be a vinegar. In the normal combination of these two elements the continuous oil phase and the dispersed aqueous phase breaks within a short period of time, normally in less than an hour. Such breaking requires the user to agitate or mix the components prior to use. Unfortunately, such breakage of the emulsion also detracts from the flavor, since the esters deriving from the added herbs and spices are more apt to be lost if such salad dressing emulsion breaks.

The present salad dressing emulsion includes the addition of a sufficient amount of divided solid curd to the emulsion of the oil phase and the dispersed acid aqueous phase. The divided solid curd material suspends in the emulsion and maintains the dispersion of the acidic aqueous phase within the acidic aqueous phase. The solid curd suspended in the solid emulsion is also believed to be capable of absorbing certain quantities of both the oil phase and the acidic aqueous phase in this regard. In most cases, the amount of divided solid curd in the suspension constitutes a saturated suspension.

The continuous oil phase may range between 50 and 80 percent by weight of the total emulsion. Likewise, the dispersed acidic phase may range between 15 and 30 percent of the total weight of the emulsion. Finally, the divided solid curd phase may range between 5 and 20 percent by weight of the total weight of the emulsion. Preferably, the salad dressing emulsion of the present invention may have a total weight of 5 parts, three parts of which are the continuous oil phase, one part of which is the dispersed acidic aqueous phase, and one part of which is the divided solid curd suspended in the emulsion.

The divided solid curd portion may comprise well known cheeses such as parmesan, mozzarella, and the like. In addition, flavor components such as herbs and spices may be added from trace amounts to approximately five percent of the total weight of the emulsion. No heating, cooling, or adding of preservatives is required to produce the salad dressing emulsion of the present invention.

It may be apparent that a novel and useful salad dressing has been herein above described it is therefore an object of the present invention to provide a salad dressing emulsion which is relatively simple to manufacture and exhibits an acceptable shelf life and stability.

Another object of the present invention is to provide a salad dressing emulsion which exhibits extremely good taste and maintains such flavor characteristics for a long period of time.

A further object of the present invention is to provide a salad dressing emulsion which is stable and retains the flavor imparted by herbs and spices added to the emulsion.

The invention possesses other objects and advantages especially as concerns particular characteristics and features thereof which will become apparent as the specification continues.

Figure 1:
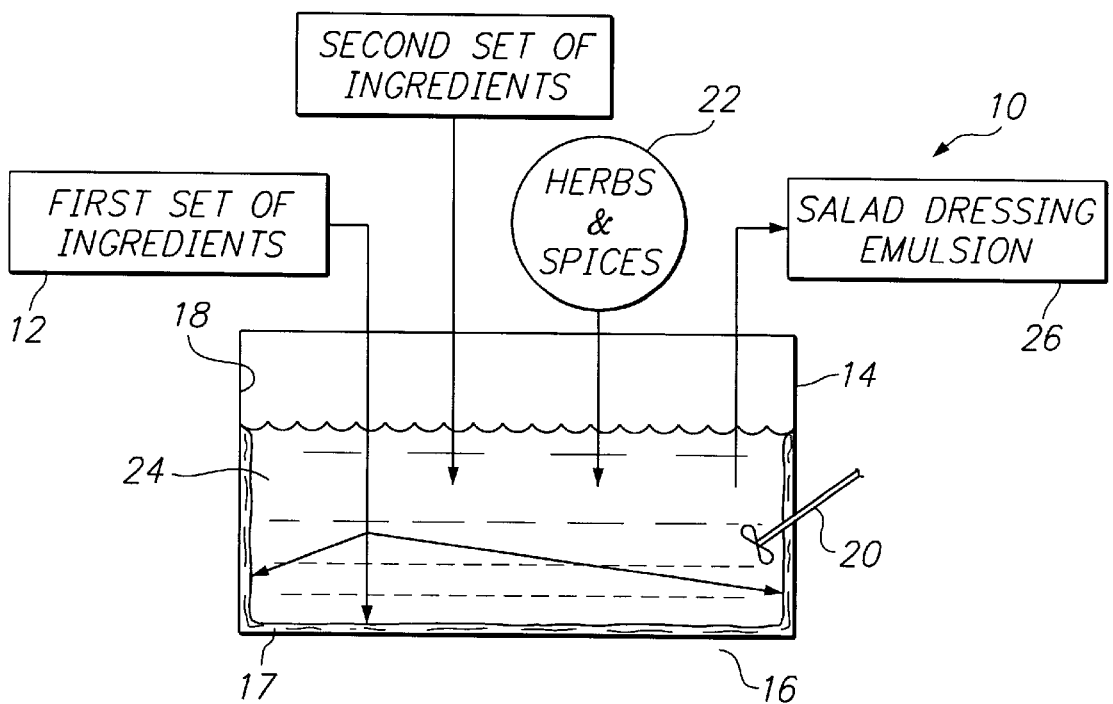
FIG. 1 is a schematic view illustrating the process for producing the salad dressing emulsion of the present invention.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the hereinabove described drawing.

The invention as a whole is depicted in the drawing by the emulsion 10. It should also be understood that a novel process is employed to produce the emulsion 10. Generally the finished emulsion 10 includes a continuous oil phase and a dispersed acidic aqueous phase. In addition, a sufficient amount of divided solid curd is suspended in the solid emulsion and maintains the dispersion of the acidic aqueous phase in the continuous oil phase. The continuous oil phase may take the form of olive oil, sunflower oil, and other oils generally used in salad dressings. The dispersed acidic aqueous phase is normally a vinegar. The divided curd suspended in the emulsion is normally a cheese which has been divided by grating or chopping. It is theorized that this divided solid curd partially dissolves in the oil phase and in the aqueous acidic phase, thus, preventing the breaking of the emulsion for a period of time in excess of the normal time to break a simple mixture of oil and vinegar.

Referring to FIG. 1, it may be seen that the emulsion 10 of the present invention is prepared by a process in which a first set of ingredients 12 is placed in a container 14. The first set of ingredients consists of 50 to 80 percent weight parts of the oil phase, 15 to 30 percent weight parts of the acidic aqueous phase, and 15 to 30 weight parts of the divided solid curd. The first set of ingredients added to container 14 are worked into a paste 17 which coats the bottom 16 and sides 18 of container 14. It is believed that the higher portion of the divided solid curd in the paste insures eventual saturation of the curd in the emulsion 10.

A second set of ingredients is placed in the container and remains in a fluid state above paste 17. The second set of ingredients consists of 50 to 80 percent weight parts of the oil phase, 15 to 30 percent weight parts of the acidic aqueous phase, and 15 to 20 percent weight parts of the divided solid curd. Mixer 20, depicted schematically in FIG. 1, agitates second set of ingredients in its fluid state. In addition, herbs and spices 22 may be added to fluid body 24 either prior to or during the agitation by mixer 20. Finally, fluid body 24 is decanted into a reservoir 26 for the purpose of bottling into smaller quantities. It has been found that the emulsion 10 of the present invention is extremely stable, maintaining its state for about 15 days prior to breaking. Also the shelf life of the salad dressing emulsion is approximately 45 days without refrigeration. With refrigeration, the shelf life is extended to six or seven months.

The following example is intended to illustrate the invention, but is not deemed to limited in any manner.

EXAMPLE I

A four quart bowl was employed and kept at room temperature. A combination of three weight parts olive oil, one weight part balsamic vinegar, and one and a half weight parts parmesan cheese was added to the bowl. The ingredients were mixed into a paste and were left on the bottom and sides of the bowl. A second set of ingredients having three weight parts of olive oil, one weight part of balsamic vinegar, and one weight part of grated parmesan cheese was then added to the bowl above paste. Four tablespoons of garlic, salt, and pepper were also added to the fluid ingredients in the bowl. The fluid ingredients and the herb and spices were mechanically mixed to form an emulsion. Such emulsion was then decanted into a container and sealed for observation. The emulsion was observed to keep for a period of 15 days prior to breaking. A portion of the emulsion was then tested for shelf life at room temperature. An unacceptable level of lactics yeast, and mold resulted after approximately 45 days. Prior to testing, a sample of the dressing was tasted and assessed as possessing an excellent consistency, and flavor.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A process for preparing a salad dressing emulsion having a continuous oil phase and a dispersed aqueous phase, comprising the steps of:

a. mixing a first set of ingredients in a container consisting of 50 to 80 percent weight parts of an oil phase, 15 to 30 percent weight parts of an acidic aqueous phase, and 15 to 30 parts of a divided solid curd;

b. forming a paste on a surface of a container of said first set of ingredients;

c. mixing a second set of ingredients in said container over said paste, said second set of ingredients consisting of 50 to 80 weight parts of an oil phase, 15 to 30 percent weight parts of an acidic aqueous phasee, and 15 to 20 weight parts of a divided solid curd; and d. decanting the fluid portion from said paste portion.

2. The process of claim 1 which comprises the additional step of adding 0.1 to 5 weight parts of components selected from the group consisting of salt, pepper, garlic, herbs, and spices to said second set of ingredients.

* * * * *